US010808864B2

(12) United States Patent
Anderson et al.

(10) Patent No.: US 10,808,864 B2
(45) Date of Patent: Oct. 20, 2020

(54) SYSTEM AND METHOD FOR CONTROLLING A FIELD DEVICE

(71) Applicant: FISHER CONTROLS INTERNATIONAL LLC, Marshalltown, IA (US)

(72) Inventors: Shawn W. Anderson, Haverhill, IA (US); J. Adin Mann, III, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/307,216

(22) Filed: Jun. 17, 2014

(65) Prior Publication Data
US 2015/0362090 A1 Dec. 17, 2015

(51) Int. Cl.
*F16K 37/00* (2006.01)
*G01M 99/00* (2011.01)
(Continued)

(52) U.S. Cl.
CPC ............ *F16K 37/0041* (2013.01); *G01L 5/00* (2013.01); *G01M 99/00* (2013.01); *H02N 2/18* (2013.01);
(Continued)

(58) Field of Classification Search
CPC F16K 37/0083; F16K 37/0041; G01M 99/00; G01L 5/00
See application file for complete search history.

(56) References Cited

U.S. PATENT DOCUMENTS 3,361,240 A * 1/1968 Cagle ........................ F16D 7/00
192/141
4,573,348 A * 3/1986 Abramson ............ G01M 13/02
73/115.02
(Continued)

FOREIGN PATENT DOCUMENTS

EP 0 390 224 A2 10/1990
RU 2 367 833 C1 9/2009
(Continued)

OTHER PUBLICATIONS

International Search Report and Written Opinion for corresponding International application No. PCT/US2015/036161, dated Aug. 24, 2015.
(Continued)

*Primary Examiner* — Angelisa L. Hicks
(74) *Attorney, Agent, or Firm* — Marshall, Gerstein & Borun LLP

(57) ABSTRACT

A system and method for controlling a field device includes a valve coupler having a first portion configured to couple to an actuator rod of an actuator, a second portion configured to couple to a movable component of a control valve, and one or more sensors measuring one or more parameters indicative of the health and/or remaining service life of the control valve assembly and/or one or more components of the valve assembly. Further, at least one of the one or more sensor devices may generate energy from the control valve assembly and/or the operating environment of the control valve assembly for operation of the electronics.

22 Claims, 10 Drawing Sheets

(51) Int. Cl.
*G01L 5/00* (2006.01)
*H02N 2/18* (2006.01)

(52) U.S. Cl.
CPC .... *Y10T 137/8158* (2015.04); *Y10T 137/8175* (2015.04); *Y10T 137/9029* (2015.04)

(56) References Cited

U.S. PATENT DOCUMENTS

| | | | | |
|---|---|---|---|---|
| 4,656,409 | A | * | 4/1987 | Shimizu ............... B62D 5/0403 180/444 |
| 4,957,274 | A | * | 9/1990 | Hood ................... F16K 37/0041 251/129.04 |
| 5,487,302 | A | * | 1/1996 | Casada ................ F16K 37/0083 73/168 |
| 5,616,829 | A | | 4/1997 | Balaschak et al. |
| 5,722,286 | A | * | 3/1998 | Robert .................. G01L 5/0061 73/168 |
| 6,651,483 | B1 | * | 11/2003 | Meyer .................... G01N 9/266 137/382 |
| 6,720,882 | B2 | * | 4/2004 | Davey .................. G01M 3/2853 137/557 |
| 6,772,788 | B1 | * | 8/2004 | Klein ..................... B60T 8/363 137/557 |
| 8,353,312 | B2 | | 1/2013 | Petrenko |
| 9,022,070 | B2 | | 5/2015 | Anderson |
| 2006/0272710 | A1 | * | 12/2006 | Minervini ........... F16K 37/0033 137/487.5 |
| 2007/0018837 | A1 | * | 1/2007 | Mizutani ................. G01P 3/443 340/635 |
| 2007/0068225 | A1 | | 3/2007 | Brown |
| 2007/0145196 | A1 | * | 6/2007 | Davenport ............... B61G 7/14 246/1 C |
| 2008/0034882 | A1 | | 2/2008 | Ohta et al. |
| 2010/0076714 | A1 | | 3/2010 | Discenzo |
| 2011/0240136 | A1 | * | 10/2011 | Trottier .................... B67D 7/54 137/15.01 |
| 2014/0005960 | A1 | | 1/2014 | Anderson et al. |
| 2014/0076061 | A1 | | 3/2014 | Anderson et al. |

FOREIGN PATENT DOCUMENTS

| | | |
|---|---|---|
| RU | 2 498 138 C1 | 11/2013 |
| WO | WO-00/12830 A1 | 3/2000 |
| WO | WO-2009/040349 A1 | 4/2009 |

OTHER PUBLICATIONS

Office Action in Russian Patent Application No. 2016151541, dated Sep. 13, 2018.

\* cited by examiner

SYSTEM AND METHOD FOR CONTROLLING A FIELD DEVICE

FIELD OF THE DISCLOSURE

The present disclosure is directed to process control systems, and more particularly, to controlling a field device, wherein parameters that contribute to the operating health of the field device are monitored to provide operating personnel with the ability to diagnose and predict the health and/or remaining service life of the field device.

BACKGROUND

Process control systems, such as distributed or scalable process control systems like those used in chemical, petroleum or other processes, typically include one or more process controllers communicatively coupled to at least one host or user workstation and to one or more field devices via analog, digital, or combined analog/digital buses. The field devices, which may include, for example, control valves, valve positioners, switches, and transmitters (for example, temperature, pressure, and flow rate sensors), perform functions within the process such as opening or closing valves and measuring process parameters. The process controller receives signals indicative of process measurements made by the field devices and/or other information pertaining to the field devices, and uses this information to implement a control routine to generate control signals that are sent over the buses to the field devices to control the operation of the process. Information from each of the field devices and the controller is typically made available to one or more applications executed by the user workstation to enable operator personnel to perform any desired function regarding the process, such as viewing the current state of the process and/or modifying the operation of the process. In the event that a field device fails, the operational state of the entire process control system can be jeopardized.

SUMMARY

One aspect of the present invention is directed to a system for controlling a field device, for example, a valve, in a controlled process. The system includes a control valve, an actuator, and a coupling component configured to transmit a mechanical actuator output to an input to the control valve. The coupling component includes one or more sensors measuring one or more parameters indicative of the health and/or remaining service life of the control valve assembly and/or one or more components of the control valve assembly.

Another aspect of the invention is directed to a valve coupler including a first portion configured to couple to an actuator rod of an actuator, a second portion configured to couple to a movable component of a control valve, and one or more sensors measuring one or more parameters indicative of the health and/or remaining service life of the control valve assembly and/or one or more components of the control valve assembly.

A further aspect of the invention is directed to a method for measuring the health and/or remaining service life of a control valve assembly. The method includes measuring, via one or more sensors in a valve coupler coupling an actuator to a control valve, one or more parameters, and transmitting the measured one or more parameters to a module configured to collect and process the one or more parameters to determine the health and/or remaining service life of the control valve assembly and/or one or more components of the control valve assembly.

DETAILED DESCRIPTION

Figure 1:
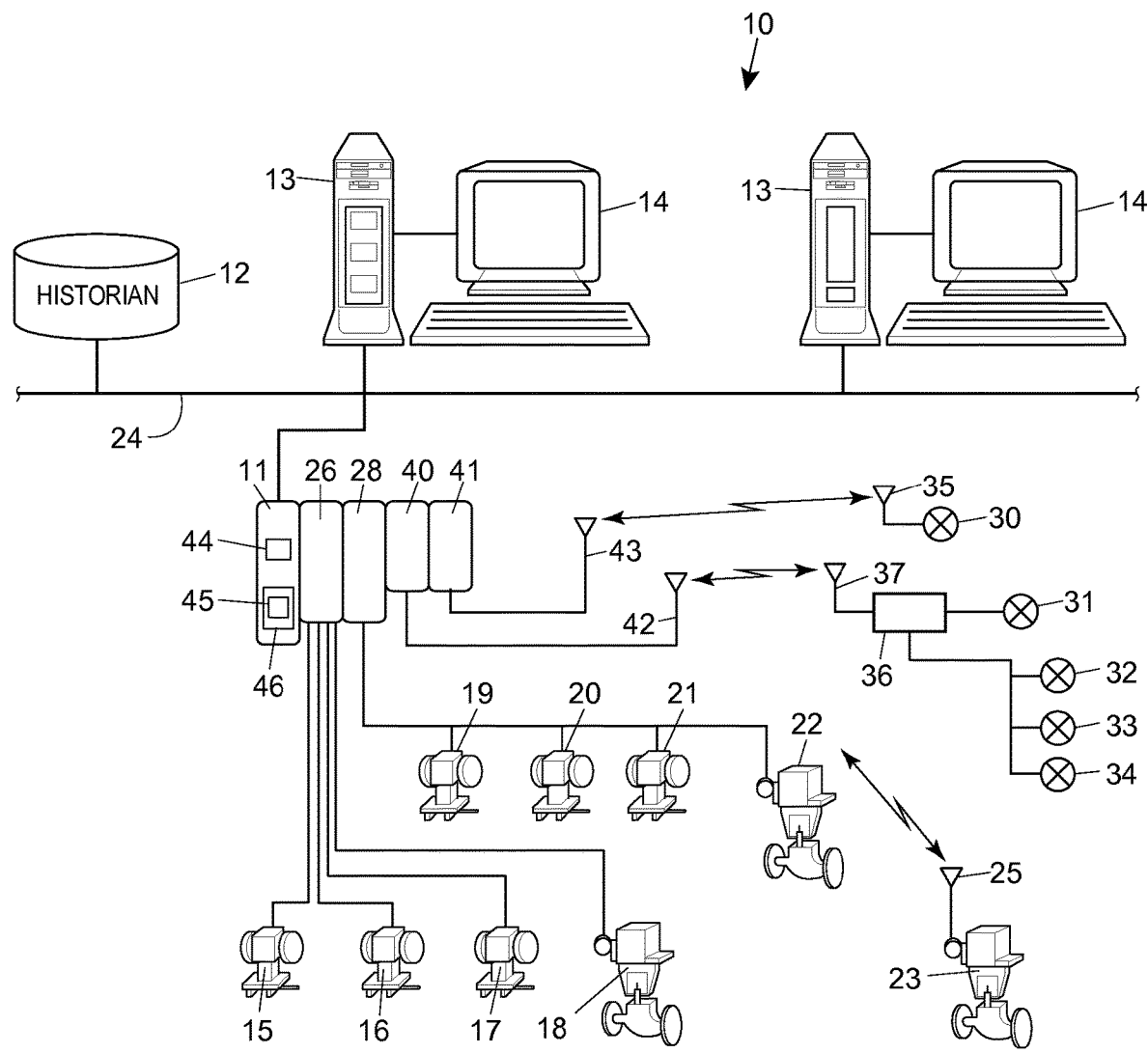
FIG. 1 is a schematic diagram of an example process plant having a distributed control system and maintenance network including one or more operator and maintenance workstations, controllers, field devices, and supporting equipment, in which one or more of the principles of the present invention may be implemented.

Referring now to FIG. 1, an example process plant 10 in which a fault detection and isolation system may be implemented includes a number of control and maintenance systems interconnected together with supporting equipment via one or more communication networks. In particular, the process plant 10 includes one or more field devices 15, 16, 17, 18, 19, 20, 21, 22, 23 in communication with a process controller 11. The process controller 11 is communicably coupled to a data historian 12 and one or more user workstations 13. The data historian 12 may be any desired type of data collection unit having any desired type of memory and any desired or known software, hardware, or firmware for storing data. Moreover, while the data historian 12 is illustrated as a separate device in FIG. 1, it may instead or in addition be part of one of the workstations 13 or another computing device, such as a server. Each workstation 13 includes a user interface 14 to facilitate communication with the process system 10. The user interface 14 may include a user interface module and one or more devices, such as a display screen, touch-screen, keyboard, and a mouse, for example.

The controller 11, which may be, by way of example, a DeltaV™ controller sold by Emerson Process Management, is communicatively connected to the workstations 13 and to the data historian 12 via a communication network 24 that may be, for example, an internet or Ethernet connection. So configured, the controller 11 may monitor and/or control the field devices 15, 16, 17, 18, 19, 20, 21, 22, 23, by delivering signals to and receiving signals from the field devices 15, 16, 17, 18, 19, 20, 21, 22, 23 and the workstations 13 to control the process control system. In additional detail, the process controller 11 of the process system 10 of the version depicted in FIG. 1 is connected via hardwired communication connections to the field devices 15, 16, 17, 18, 19, 20, 21, 22 via input/output (I/O) cards 26 and 28. The field devices 15, 16, 17, 18, 19, 20, 21, 22 are illustrated as being communicatively connected to the controller 11 via a hardwired communication scheme, which may include the use of any desired hardware, software, and/or firmware to implement hardwired communications, including, for example, standard 4-20 mA communications, and/or any communications using any smart communication protocol such as the FOUNDATION® Fieldbus communication protocol, the HART® communication protocol, etc.

The field devices 15, 16, 17, 18, 19, 20, 21, 22 may be any types of devices, such as sensors, control valve assemblies, transmitters, positioners, for example, while the I/O cards 26, 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices that communicate over a digital bus to the I/O card 28 using Fieldbus protocol communications. Of course, the field devices 15, 16, 17, 18, 19, 20, 21, 22 may conform to any other desired standard(s) or protocols, including any standards or protocols developed in the future.

The process control system 10 depicted in FIG. 1 also includes a number of wireless field devices 23, 30, 31, 32, 33, 34 disposed in the plant to be monitored and/or controlled. The field device 23 is depicted as a control valve assembly including, for example, a control valve, while the field devices 30, 31, 32, 33, 34 are depicted as transmitters, for example, process variable sensors. Wireless communications may be established between the controller 11 and the field devices 23, 30, 31, 32, 33, 34 using any desired wireless communication equipment, including hardware, software, firmware, or any combination thereof now known or later developed. In the version illustrated in FIG. 1, an antenna 25 is coupled to the control valve assembly 23 to perform wireless communications for the control valve assembly 23. Likewise, an antenna 35 is coupled to and is dedicated to facilitate wireless communications for the transmitter 30, while a wireless router or other module 36 having an antenna 37 is coupled to collectively coordinate wireless communications for the transmitters 31, 32, 33, 34. The field devices or associated hardware 23, 30, 31, 32, 33, 34, 36 may implement protocol stack operations used by an appropriate wireless communication protocol to receive, decode, route, encode, and send wireless signals via the antennas 25, 35, 37 to implement wireless communications between the process controller 11 and the control valve assembly 23 and the transmitters 30, 31, 32, 33, 34. The transmitters 30, 31, 32, 33, 34 may constitute the sole link between various process sensors (transmitters) and the process controller 11 and, as such, are relied upon to send accurate signals to the controller 11 to ensure that process performance is not compromised. The transmitters 30, 31, 32, 33, 34 are often referred to as process variable transmitters (PVTs) and may play a significant role in the control of the overall control process.

One or more I/O devices 40, 41 are operatively coupled to the process controller 11. Each I/O device is connected to a respective antenna 42, 43 and the I/O devices and antennas operate as transmitters/receivers to perform wireless communications with the wireless field devices 23, 30, 31, 32, 33, 34 via one or more wireless communication networks. The wireless communications with the field devices 23, 30, 31, 32, 33, 34 may be performed using one or more known wireless communication protocols, such as the WirelessHART® protocol, the Ember protocol, a WiFi protocol, an IEEE wireless standard, etc. Still further, the I/O devices 40, 41 may implement protocol stack operations used by these communication protocols to receive, decode, route, encode, and send wireless signals via the antennas 42, 43 to implement wireless communications between the controller 11 and the control valve assembly 23 and the transmitters 30, 31, 32, 33, 34.

The control valve assembly 23 may receive control signals from the controller 11 to effect physical parameters, for example, flow, within the overall process. In addition, the control valve assembly 23 may provide measurements made by sensors within the control valve assembly 23 or may provide other data generated by or computed by the control valve assembly 23 to the controller 11 as part of its operation. As illustrated in FIG. 1, the controller 11 conventionally includes a processor 44 that implements or oversees one or more process control and/or diagnostic routines 45 (or any module, block, or sub-routine thereof) stored in a memory 46. The process control and/or diagnostic routines 45 stored in the memory 46 may include or be associated with control loops being implemented within the process plant. Generally speaking, and as is generally known, the process controller 11 executes one or more control routines 45 and communicates with the field devices 15, 16, 17, 18, 19, 20, 21, 22, 23, 30, 31, 32, 33, 34, the user workstations 13, and the data historian 12 to control a process in any desired manner.

Figure 2:
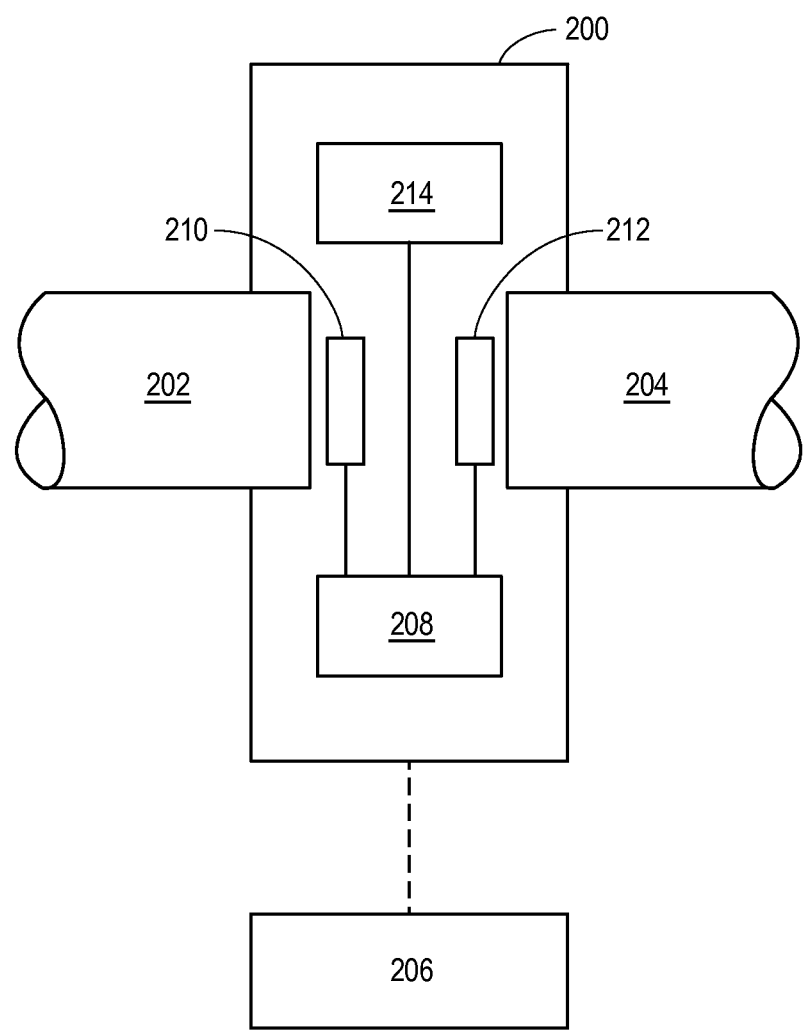
FIG. 2 is a schematic diagram of an example coupler constructed in accordance with the principles of the present invention and affixed to an actuator arm and a valve stem of a valve.

The health and operability of the field devices 15, 16, 17, 18, 19, 20, 21, 22, 23, 30, 31, 32, 33, 34, and ultimately the performance of the process system, may be adversely affected by several factors. For a field device such as a control valve assembly, for example, flow and/or trim looseness may occur due to the valve leaking, straining, and/or vibrating. To monitor the health and/or remaining service life of the control valve assembly and/or one or more components of the control valve assembly, one or more control valve parameters associated with one or more of the adverse factors may be monitored and/or measured. FIG. 2 depicts one embodiment of a coupler 200 utilized to facilitate the monitoring and/or measuring of the control valve health parameters. The coupler 200 couples an actuator rod 202 to a valve stem or valve shaft 204. That is, depending upon the type of valve being monitored, the coupler 200 couples the actuator rod 202 with a valve stem of a linear valve type such as a sliding stem valve type or a globe style valve type; and for a rotary valve type, the coupler 200 couples the actuator rod 202 to a valve shaft.

Valve parameters associated with one or more factors that adversely affect control valve performance, include, and are not limited to, stem force (in a sliding stem or globe style valve) and dynamic torque (in a rotary valve); through-valve leakage; strain; vibration due to flow and/or trim component looseness; and vibration or poor motion control caused by looseness or damage in the drive train components. Sensors included within or near the coupler 200 may collect and/or transmit information corresponding to one or more such parameters and provide the information to, for example, a control processor 206 similar to controller 11 in FIG. 1, for processing and/or alerting asset management and/or control personnel. The sensors are communicably coupled to a communication module 208 wherein information received from the sensors may be stored, analyzed, and/or transmitted via wired or wireless communication to the controller 206 or some other processor based device that is either local or remote. Some example sensors that may be integrated within and/or near the coupler 200 and utilized by the controller and/or communication module 208 to monitor the health and/or remaining service life of the control valve assembly and/or one or more components of the control valve assembly include a vibration sensor 210, an acoustic emission sensor 212, and/or a stem force or shaft torque sensor 214.

The vibration sensor 210 may facilitate the diagnosing of the health and/or remaining service life of the control valve assembly and/or one or more components of the control valve assembly, and/or operating environment by providing a signal to the controller that includes information relating to flow induced vibration and looseness of the valve's internal components. In one embodiment, the vibration sensor 210 may be an accelerometer integrated into the coupler 200 and communicably connected to the controller 206 of the process plant.

The acoustic emission sensor 212 facilitates the diagnosing of the health and/or remaining service life of the control valve assembly and/or one or more components of the control valve assembly, and/or operating environment by providing a signal including information related to monitoring valve leakage, stem and/or shaft integrity, other drivetrain component integrity and internal trim condition. In one embodiment, the acoustic emission sensor 212 is positioned near or against a flat end of the valve stem or valve shaft 204. In this configuration, the valve stem/shaft 204 and the connected trim element will act as a wave guide for acoustic emissions and facilitate the transmission of the desired signal out of the generally inaccessible cavity of the valve body.

The stem force or shaft torque sensor 214 facilitates the diagnosing of the health and/or remaining service life of the control valve assembly and/or one or more components of the control valve assembly, and/or operating environment by enabling measurement of the stem force or shaft torque. Readily available measurements that may be collected at relatively low acquisition levels include, at least, valve seat force, valve seat torque, and friction measurements. Additional diagnostic measurements that may be acquired using higher sample rates include dynamic stem force related to flow stability within the control valve.

Empirical analyses of information attained from one or more sensors 210, 212, 214 reveals that dynamic stem force may be a measure of the flow stability within the valve body. For example, dynamic stem force has been measured on a 12-inch valve known to have unstable behavior in some applications. The measured dynamic stem force, as a function of inlet pressure, stem travel, cage type, plug type, and pressure drop ratio; demonstrates a variable presence of instability. The instability is a consequence of pressure on the exposed surfaces of the valve plug.

Figure 3:
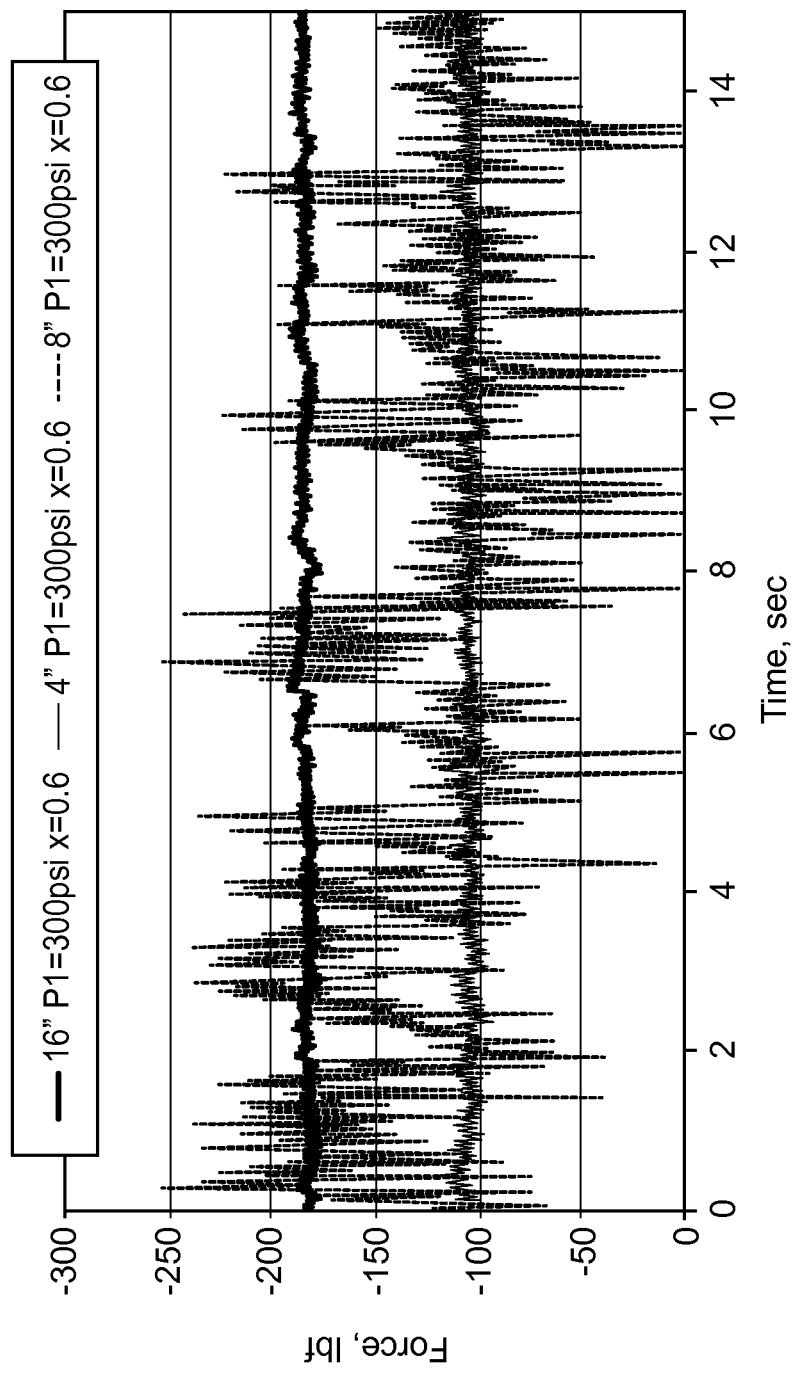
FIG. 3 is a graph of measured stem forces of a 12-inch valve for 15 seconds of a 20-second test.

FIG. 3 is a graph illustrating the measured stem force for a 12-inch valve having an 11-inch port and long neck with up to 8 inches of stem travel. The valve was configured in a flow-up arrangement with 300 pound-per-square inch (psi) inlet pressure. The total test time was 20 seconds and measurements for the first 15 seconds of the test are shown in the graph.

Figure 4:
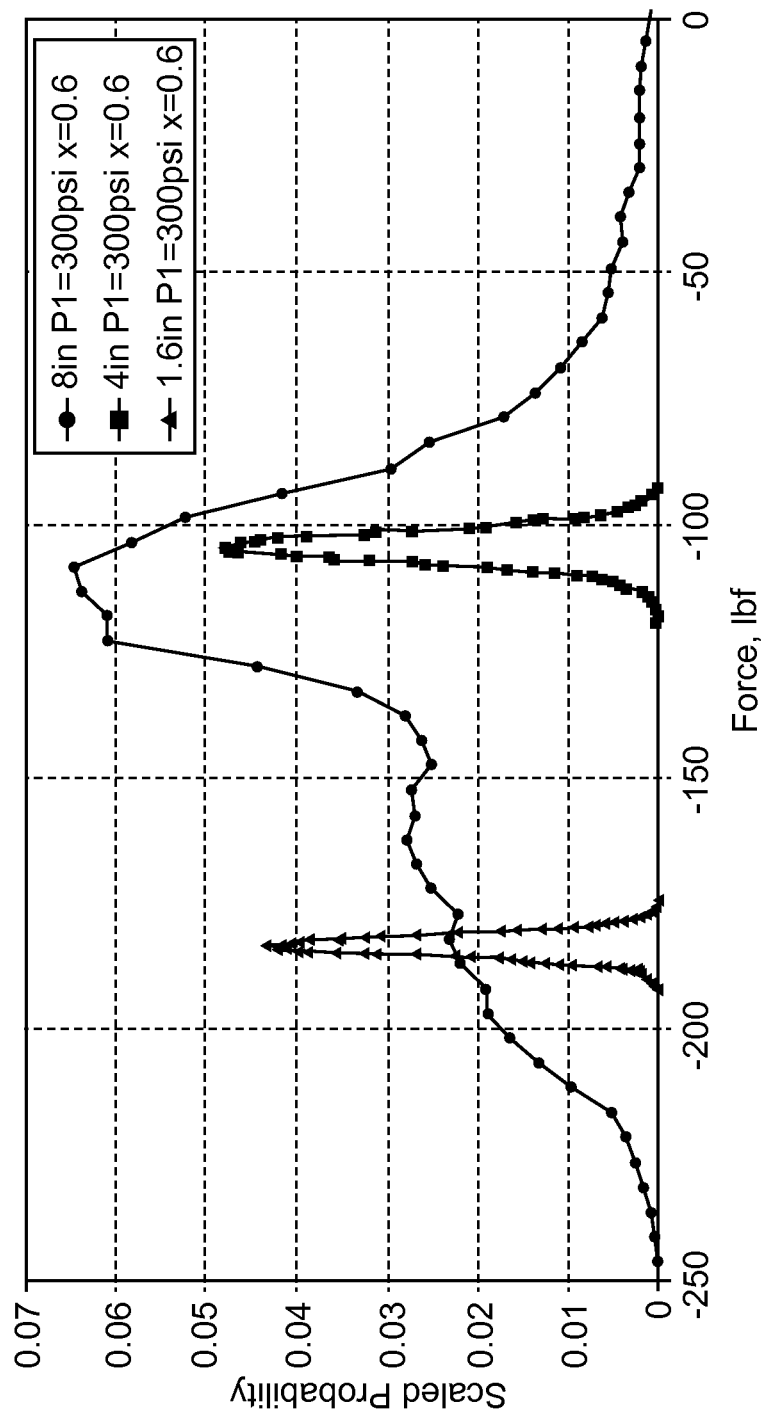
FIG. 4 is a graph depicting a histogram of the measured stem force signals shown in FIG. 3.

FIG. 4 is a graph displaying histograms of the force time signals depicted in FIG. 3, but over the full 20 second test. The histogram is used to determine the scaled probability that, for any time during the test, the stem force will have a specified force value. The histograms shown in FIG. 4 illustrate that at full stem travel (for example, 8-inches), the force varies widely over a large range and there are two general force values where there are peaks in the probability. For 50% stem travel (4-inches) and 20% stem travel (1.6-inches), the force is stable, although at different mean values.

Figure 5:
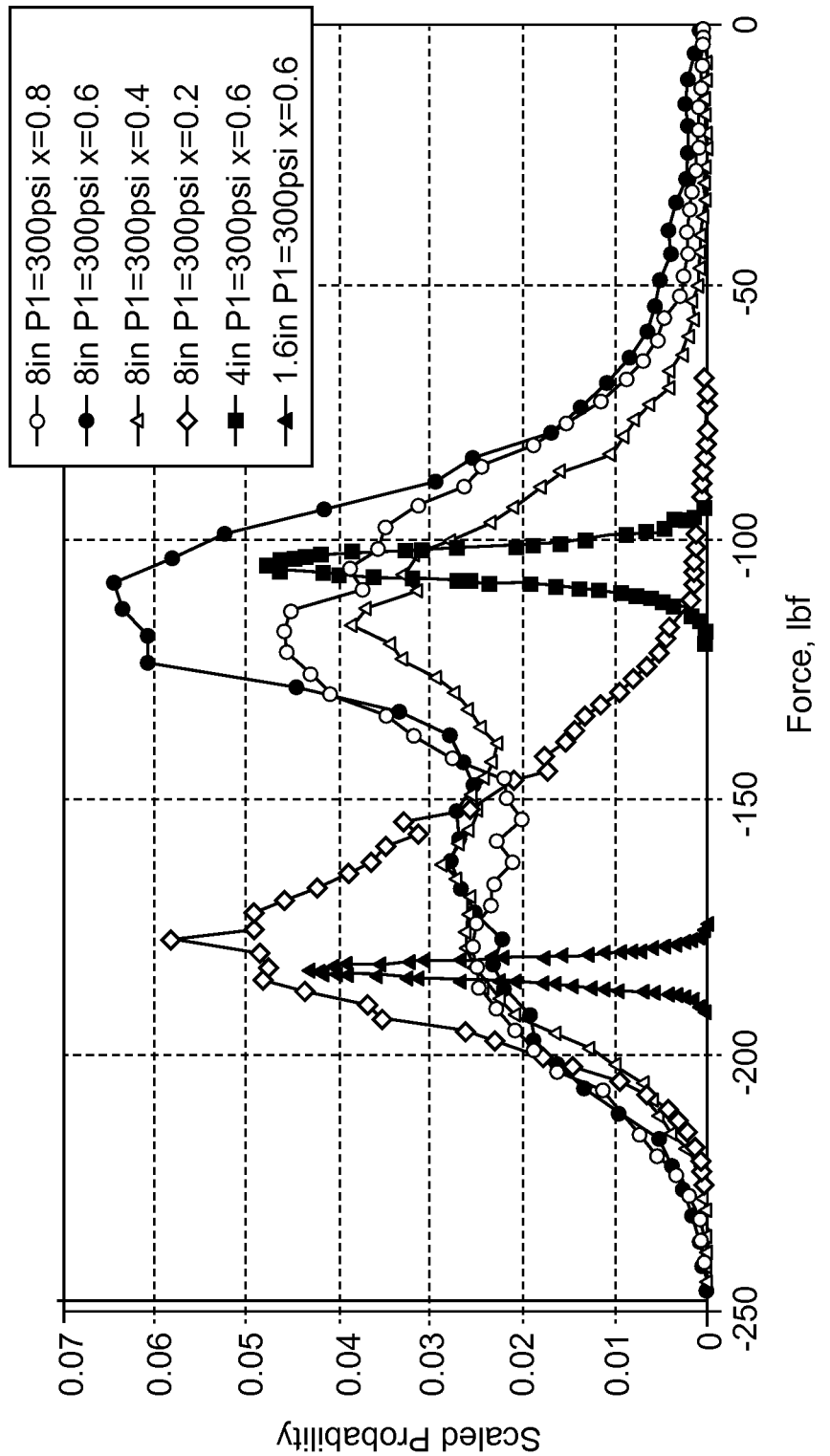
FIG. 5 is a graph depicting histograms of measured stem force signals for various valves having a 300 psi inlet pressure and various stem travel distances or lengths and pressure drop ratios.
Figure 6:
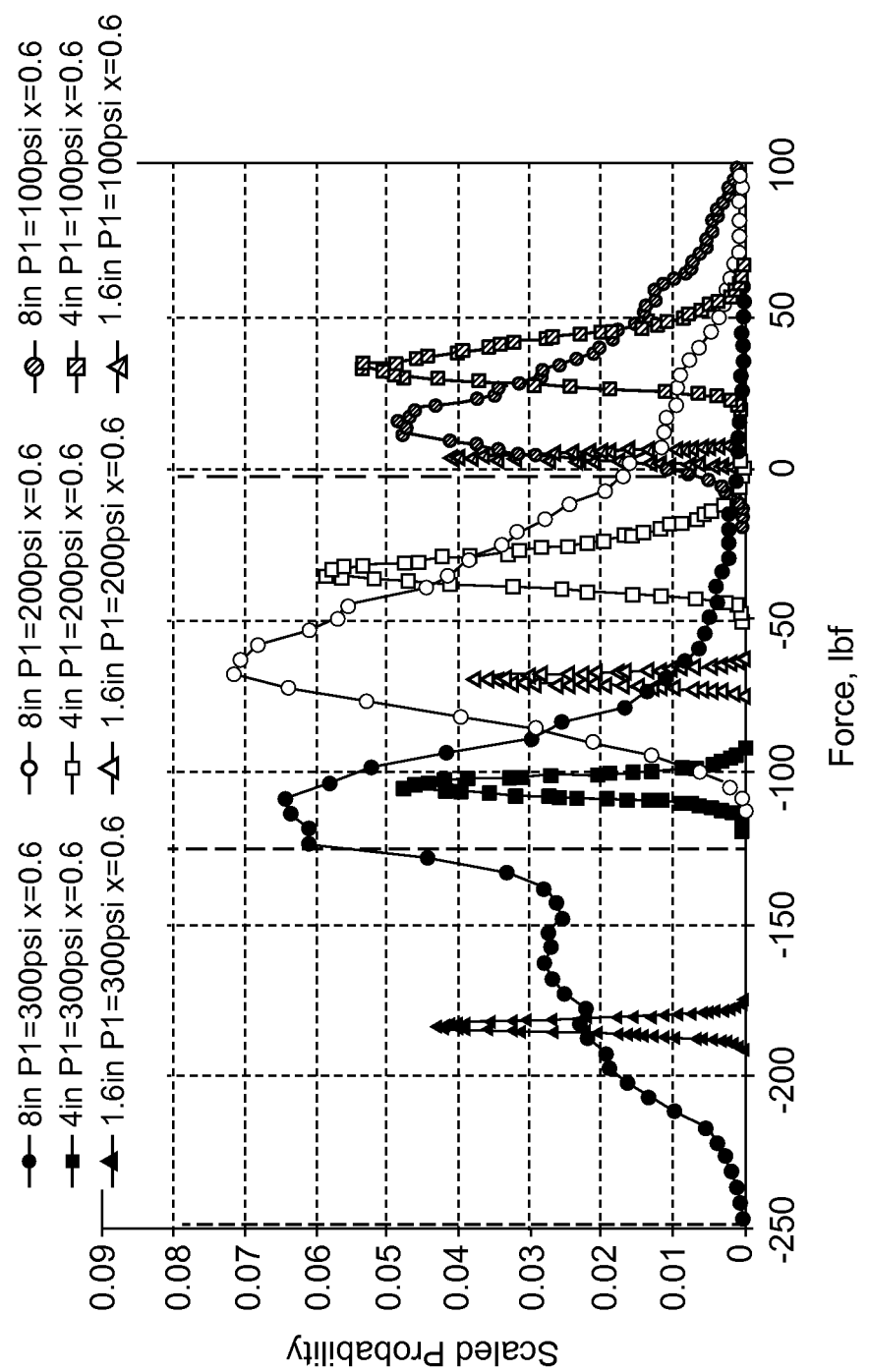
FIG. 6 is a graph depicting histograms of measured stem force signals at a pressure drop ratio of 0.6 and various inlet pressures and stem travel distances or lengths.

In FIG. 5, additional results attained for 300 psi inlet pressure are shown for changes in stem travel and pressure drop ratio. The results show two main stable forces, a first main stable force at approximately −170 to −180 lbf. and a second main stable force at approximately −100 to −120 lbf. In instances of 50% stem travel (4 inches) and 20% stem travel (1.6 inches), the force is stable; fluctuating near the mean and at the two different points. For the instance of full 100% stem travel (8 inches) and a pressure drop ratio of 0.2, the force is centered on the first main stable point, but also includes a large amount of variation compared to the lesser stem travel distances. Then, at the higher pressure drop ratios (0.4, 0.6, and 0.8), the stem force changes between the two main stable points and has a much wider range of variation. These results illustrate how the static force, as well as stability, are linked and are a function of the valve travel distance (or length) and the pressure drop ratio. In particular, FIG. 6 shows the stem force histogram data shown in FIG. 5 with a pressure drop ratio of 0.6 and an inlet pressure of 300 psi along with data at inlet pressures of 100 psi and 200 psi and a pressure drop ratio of 0.6. The results in FIG. 6 show that there is a similar pattern of stable and unstable stem force conditions as stem travel is changed at each inlet pressure valve.

Measuring the dynamic stem force requires a means to create a time signal that represents the stem force. A digital form of that time signal is then acquired prior to processing of the time signal. The measurement of the stem force can be accomplished in several ways. For example, one direct technique is to include a force sensor within the valve stem. Another technique includes measuring the strain on the valve stem or actuator rod. Yet another technique includes measuring the pressure difference across the actuator diaphragm or piston. Any measured pressure difference is related to the stem force while also including the dynamics of the gas volumes where the pressure is being measured.

Figure 7:
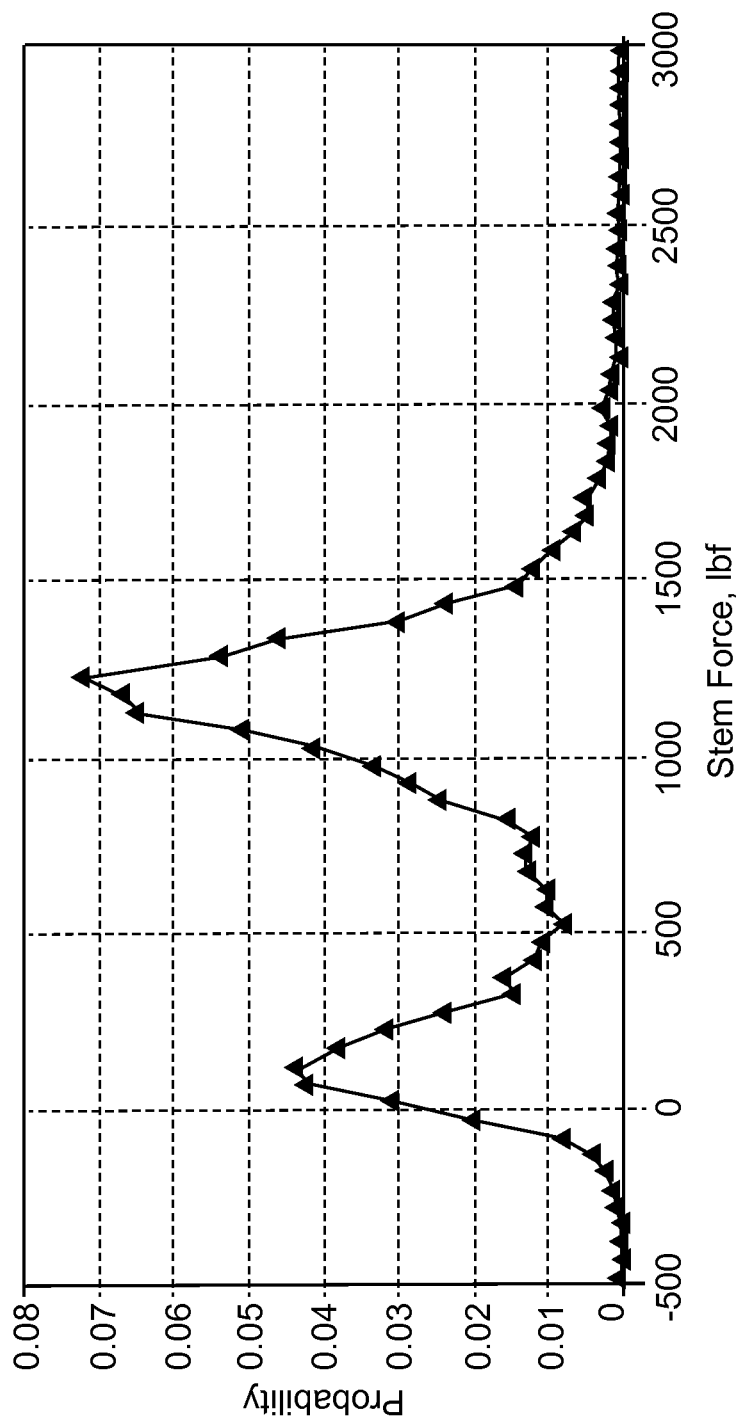
FIG. 7 is a graph depicting histograms of measured pressure drop across an actuator piston of a valve while observed buffeting in the field.

In one example of measuring the stem force by using the pressure difference across the actuator, the pressure on each side of the actuator piston was measured on a field valve known to buffet. A standard field system was used to monitor the actuator, data was measured, a pressure difference was calculated, and a histogram was calculated. The resulting histogram is illustrated in FIG. 7 and shows two stable points similarly observed in the lab stem force measurements. Thus, it is likely that the dynamic stem force measured from the pressure difference across the actuator diaphragm or piston may be used to evaluate the average stem force, as well as evaluate flow stability in the valve.

Figure 8:
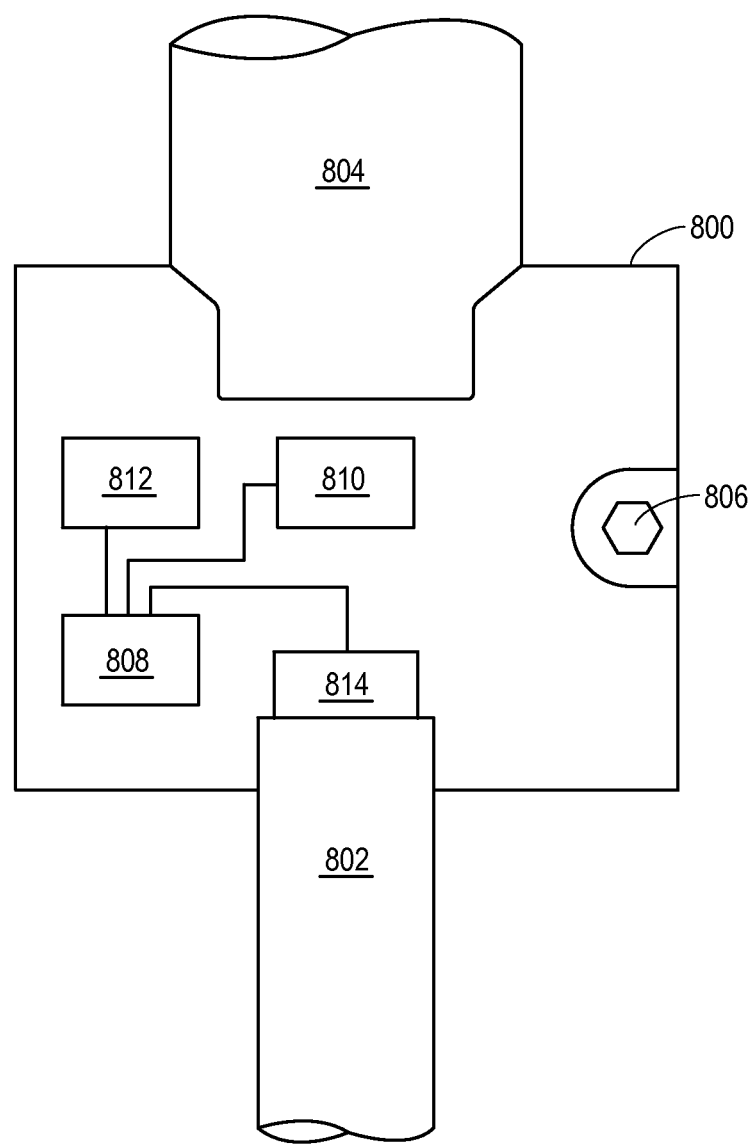
FIG. 8 is a schematic diagram of an example coupler constructed in accordance with the principles of the present invention and affixed to an actuator rod and a stem of a linear valve (e.g., sliding stem or globe style).

One embodiment of the present invention directed to measuring the health and/or remaining service life of a control valve assembly and/or one or more components of the control valve assembly is shown in FIG. 8. A valve coupler 800 for a sliding stem valve assembly, which is partially illustrated in the figure, couples a valve stem 802 and an actuator rod 804. The coupler 800 may incorporate one or more of the example type sensors described above into a stem connector that transmits actuator output to control the valve stem 802. The coupler 800, which may include a first portion and a second portion, is fixedly attached about an end of the actuator rod 804 and about an end of the valve stem 802. The first and second portions of the coupler 800 may be affixed to the actuator rod 804 and the valve stem 802 by a bolt, clamp, or any other affixing mechanism 806 capable of operatively attaching the coupler 800 to the actuator rod 804 and the valve stem 802. Integrated about the interior and/or exterior of the coupler 800 is a communication module 808 that is communicably coupled to one or more sensors used to monitoring the health, remaining service life, and/or operating environment of the valve assembly and/or one or more components of the valve assembly. The communication module 808 may be wired or wirelessly coupled to the control system shown in FIG. 1.

One type of sensor that may be integrated within the coupler 800 is a stem force sensor 810. The stem force sensor 810 may include a piezoelectric force sensor or a strain gauge and is capable of attaining information related to the health and/or remaining service life of the valve assembly and/or one or more components of the valve assembly. Some measurements may include a valve seat force and friction measurements that may be collected at relatively lower acquisition speeds. If higher speed sample rates are used, additional monitoring, measuring and/or diagnosing may be capable, such as the ability to measure dynamic stem force, which may then be related to flow stability within the control valve.

In another embodiment, the piezoelectric sensor used as a stem force sensor in measuring the stem force may be utilized to harvest energy. Application of the energy harvesting may be more applicable to valves that frequently modulate or change positions because the harvested energy would be attained from reversals in the force direction. Energy may also be harvested from the operating environment of the valve assembly such as vibration or heat. The harvested energy may be used to charge batteries used for diagnostic and/or prognostic sensors or to power low level functions within the control valve assembly.

Additional types of sensors that may be integrated within the coupler 800 include a vibration sensor 812 and an acoustic emission sensor 814. In one embodiment, the vibration sensor 812 includes an accelerometer, which may provide information related to flow induced vibration and looseness of the internal valve components. The acoustic emission sensor 814 may monitor through-valve leakage, stem shaft integrity, and internal trim condition. The acoustic emission sensor 814 may be located proximate the flat end of the valve stem 802. When installed in this configuration, the valve stem and connected trim element act as a wave guide for the acoustic emissions and facilitate the transmitting of the desired signal out of the generally inaccessible cavity of the valve body.

Figure 9:
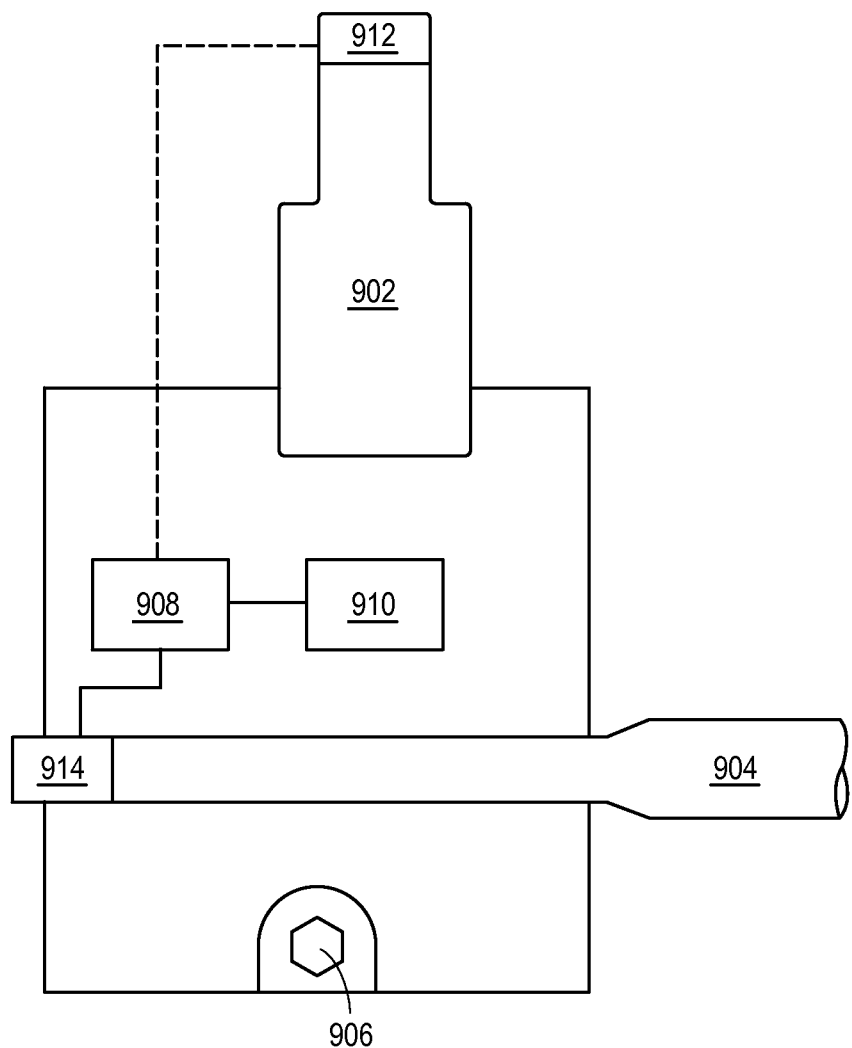
FIG. 9 is a schematic diagram of an example coupler constructed in accordance with the principles of the present invention and affixed to an actuator rod and a shaft of a rotary valve.

Another embodiment of the present invention directed to measuring the health and/or remaining service life of a control valve assembly and/or one or more components of the control valve assembly is shown in FIG. 9. A valve coupler 900 for a rotary style valve, which is partially illustrated in the figure, couples an actuator rod 902 to a valve shaft 904. The coupler 900 may incorporate one or more of the example type sensors described above into a lever arm that transmits actuator output to control the valve shaft 904. The coupler 900, which may include a first portion and a second portion, is fixedly attached about an end of the actuator rod 902 and about an end of the valve shaft 904. The first and second portions of the coupler 900 may be affixed to the actuator rod 902 and the valve shaft 904 by a bolt, clamp, or any other affixing mechanism 906 capable of operatively attaching the coupler 900 to the actuator rod 902 and the valve shaft 904. Integrated about the interior and/or exterior of the coupler 900 is a communication module 908 that is communicably coupled to one or more sensors used to monitor the health, remaining service life, and/or operating environment of the valve assembly and/or one or more components of the valve assembly. The communication module 908 may be wired or wirelessly coupled to the control system shown in FIG. 1.

One type of sensor that may be integrated within the coupler 900 is a shaft torque sensor 910. The shaft torque sensor 910 may include a piezoelectric torque sensor or a strain gauge and is capable of attaining information related to the health and/or remaining service life of the valve assembly and/or one or more components of the valve assembly. Some measurements may include a valve seat torque and friction measurements that may be collected at relatively lower acquisition speeds. If higher speed sample rates are used, additional monitoring, measuring, and/or diagnosing may be capable, such as the ability to measure dynamic stem torque, which may then be related to flow stability within the control valve.

In another embodiment, the piezoelectric sensor used as a shaft torque sensor for measuring the shaft torque may be utilized to harvest energy. Application of the energy harvesting may be more applicable to valves that frequently modulate or change positions because the harvested energy would be attained from reversals in the force direction. Energy may also be harvested from the operating environment of the valve assembly, such as vibration or heat. The harvested energy may be used to charge batteries used for diagnostic and/or prognostic sensors or to power low level functions within the control valve assembly.

Additional types of sensors that may be integrated within the coupler 900 include a vibration sensor 912 and an acoustic emission sensor 914. In one embodiment, the vibration sensor 912 includes an accelerometer, which may provide information related to flow induced vibration and looseness of the internal valve components. The acoustic emission sensor 914 may monitor through-valve leakage, stem shaft integrity, and internal trim condition. The acoustic emission sensor 914 may be located proximate the flat end of the valve shaft 904. When installed in this configuration, the rotary valve shaft 904 and connected trim element act as a wave guide for the acoustic emissions and facilitate the transmitting of the desired signal out of the generally inaccessible cavity of the valve body.

Figure 10:
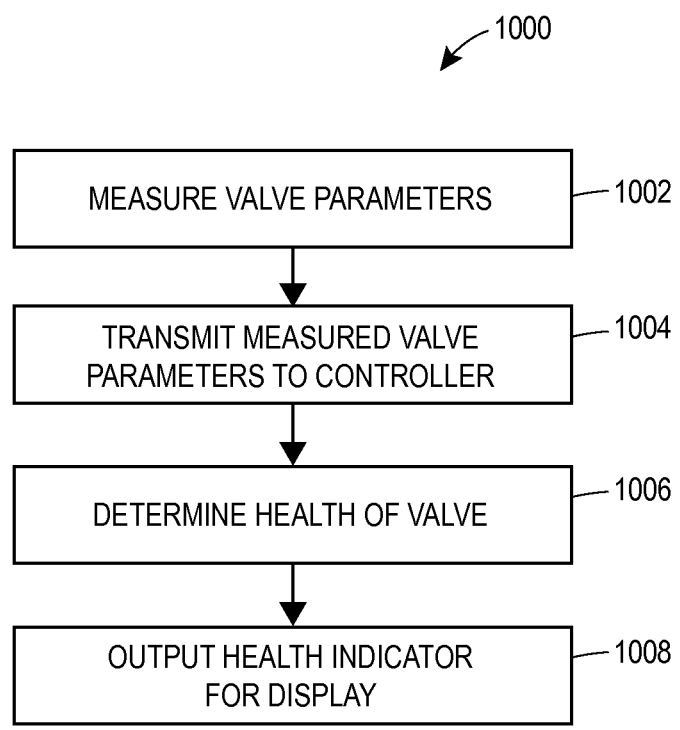
FIG. 10 is a flow diagram of an example method for controlling valve in accordance with the principles of the present disclosure.

A flow diagram 1000 of an example method for measuring the health and/or remaining service life of a field device and/or one or more components of the field device, for example, a control valve assembly, implemented in a process system depicted in FIG. 1 is shown in FIG. 10. The method may be integrated into one or more modules stored in the memory and is capable of being executed on one or more processors of the controller or the coupler of the control valve assembly. One or more valve parameters associated with the health, expected life, and/or operating environment of the control valve assembly are measured (block 1002). One or more wired or wireless sensors may be utilized to facilitate measuring of the valve parameters, including, at least: a stem force sensor, a shaft torque sensor, an acoustic sensor, a valve seat force sensor, a valve seat torque sensor, and a vibration sensor. The valve parameter information attained by the one or more sensors may be collected into a memory device and is ultimately transmitted to the controller (block 1004). The controller processes one or more of the received valve parameters and determines the health and/or remaining service life of the control valve assembly and/or one or more components of the valve assembly (block 1006). The determination of the health and/or remaining service life of the control valve assembly and/or one or more components of the valve assembly may include calculating or equating a score or indicator corresponding to the determined health of the valve and/or valve component. The health and/or remaining service life score or indicator of the valve and/or valve component may be output to a device capable of storing the score or indicator and/or emitting a signal, reflecting the health and/or remaining service life of the control valve assembly and/or one or more components of the control valve assembly (block 1008). The emitted signal may include an aural and/or visual component.

In another embodiment of the invention, the method may include harvesting energy from the valve parameter component that is being monitored, sensed, and/or measured. In one configuration, a piezoelectric sensor used as a sensor for stem force or shaft torque measurement may facilitate the harvesting of energy from the valve. Energy may also be harvested from the operating environment of the valve assembly, such as vibration or heat. The harvested energy may be used to power low level functions within the control valve assembly and/or charge batteries used by the sensors.

It is apparent from the description above that the operating environment, health, remaining service life, and operability of a field device and/or component thereof, such as a control valve assembly and/or one or more components of the control valve assembly, may be effectively measured by incorporating one or more sensors with a coupler to monitor valve performance, diagnose valve health, and/or predict the remaining service life of the valve assembly and/or one or more components of the valve assembly as described herein.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated unless specifically described as such. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of particular operations may be distributed among the one or more processors, not only residing within a single machine, but deployed across a number of machines. In some example embodiments, the processor or processors may be located in a single location (e.g., within a home environment, an office environment, a mobile platform, or as a server farm), while in other embodiments the processors may be distributed across a number of locations.

The performance of particular operations may be distributed among the one or more processors, not only residing within a single machine, but deployed across a number of machines. In some example embodiments, the one or more processors or processor-implemented modules may be located in a single geographic location (e.g., within a home environment, an office environment, a mobile platform, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "identifying," "predicting," "analyzing," and the like may refer to actions or processes of a machine (e.g., a computing device) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other in an operative manner to achieve the intended design effect. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of a system and method for controlling a field device, for example, a control valve. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A system comprising a control valve, an actuator, and a coupling component configured to transmit a mechanical actuator output to an input to the control valve, wherein the coupling component comprising one or more sensors measuring one or more parameters indicative of the health and/or remaining service life, of the control valve assembly and/or one or more components of the control valve assembly.

Aspect 2: The system of aspect 1, wherein the control valve is a sliding stem valve or a globe style valve, and the coupling component is a stem connector.

Aspect 3: The system of aspect 1, wherein the control valve is a rotary valve and the coupling component is a lever arm.

Aspect 4: The system of any one of aspects 1 to 3, wherein the one or more sensors includes an accelerometer.

Aspect 5: The system of any one of aspects 1 to 4, wherein the one or more sensors includes an acoustic emission sensor.

Aspect 6: The system of aspect 5, wherein the acoustic emission sensor is disposed at a flat end of the input to the control valve, such that the input to the control valve acts as a wave guide for acoustic emissions, transmitting acoustic energy from a cavity within the control valve to the acoustic emission sensor.

Aspect 7: The system of any one of aspects 1 to 6, wherein the one or more sensors includes a stem force sensor.

Aspect 8: The system of any one of aspects 1 to 7 wherein the one or more sensors includes a shaft torque sensor.

Aspect 9: The system of either aspect 7 or 8, wherein the one or more parameters measured by the one or more sensors includes valve seat force or valve seat torque.

Aspect 10: The system of any one of aspects 7 to 9, wherein the one or more parameters measured by the one or more sensors includes a friction measurement.

Aspect 11: The system of any one of aspects 7 to 10, wherein the one or more parameters measured by the one or more sensors includes dynamic stem force.

Aspect 12: The system of aspect 11, wherein the one or more parameters is related to flow stability within the control valve.

Aspect 13: The system of any one of aspects 1 to 12, wherein the one or more parameters measured by the one or more sensors includes stem force for a sliding stem valve or dynamic torque for a rotary valve.

Aspect 14: The system of any one of aspects 1 to 13, wherein the one or more parameters measured by the one or more sensors includes strain.

Aspect 15: The system of any one of aspects 1 to 14, wherein the one or more parameters measured by the one or more sensors includes vibration due to flow and/or trim looseness.

Aspect 16: The system of any one of aspects 1 to 15, wherein the one or more parameters measured by the one or more sensors includes through-valve leakage.

Aspect 17: The system of any one of aspects 1 to 16, further comprising a module for collecting and processing the one or more parameters to determine the health and/or remaining service life of the control valve assembly and/or one or more components of the control valve assembly.

Aspect 18: The system of aspect 17, wherein the module for collecting and processing the one or more parameters is part of a digital valve controller.

Aspect 19: The system of either aspect 17 or aspect 18, wherein the coupling component comprises a wireless communication module configured to communicate via a wireless standard or any other wireless communications protocol with the module for collecting and processing the one or more parameters.

Aspect 20: The system of any one of aspects 1 to 19, wherein the one or more sensors implements a device, one example being a piezoelectric device, that generates energy from the actuation of the control valve and/or the environment via the coupling component.

Aspect 21: A valve coupler comprising a first portion configured to couple to an actuator rod of an actuator, a second portion configured to couple to a movable component of a control valve, and one or more sensors measuring one or more parameters indicative of the health and/or remaining service life of the control valve assembly and/or one or more components of the control valve assembly.

Aspect 22: The valve coupler of aspect 21, wherein the control valve is a sliding stem valve or a globe style valve, the movable component is a valve stem, and the second portion is configured to couple to the valve stem.

Aspect 23: The valve coupler of aspect 21, wherein the control valve is a rotary valve, the movable component is a rotary shaft, and the second portion is configured to couple to the rotary shaft.

Aspect 24: The valve coupler of any one of aspects 21 to 23, wherein the one or more sensors includes an accelerometer.

Aspect 25: The valve coupler of any one of aspects 21 to 24, wherein the one or more sensors includes an acoustic emission sensor.

Aspect 26: The valve coupler of aspect 25, wherein the acoustic emission sensor is disposed at a flat end of the movable component of the control valve, such that the movable component of the control valve acts as a wave guide for acoustic emissions, transmitting acoustic energy from a cavity within the control valve to the acoustic emission sensor.

Aspect 27: The valve coupler of any one of aspects 21 to 26, wherein the one or more sensors includes a stem force sensor.

Aspect 28: The valve coupler of any one of aspects 21 to 27, wherein the one or more sensors includes a shaft torque sensor.

Aspect 29: The valve coupler of either aspect 27 or aspect 28, wherein the one or more parameters measured by the one or more sensors includes valve seat force or valve seat torque.

Aspect 30: The valve coupler of any one of aspects 27 to 29, wherein the one or more parameters measured by the one or more sensors includes a friction measurement.

Aspect 31: The valve coupler of any one of aspects 27 to 30, wherein the one or more parameters measured by the one or more sensors includes dynamic stem force and/or torque.

Aspect 32: The valve coupler of aspect 31, wherein the one or more parameters is related to flow stability within the control valve.

Aspect 33: The valve coupler of any one of aspects 21 to 32, wherein the one or more parameters measured by the one or more sensors includes stem force for a sliding stem valve or dynamic torque for a rotary valve.

Aspect 34: The valve coupler of any one of aspects 21 to 33, wherein the one or more parameters measured by the one or more sensors includes strain.

Aspect 35: The valve coupler of any one of aspects 21 to 34, wherein the one or more parameters measured by the one or more sensors includes vibration due to flow and/or trim looseness.

Aspect 36: The valve coupler of any one of aspects 21 to 35, wherein the one or more parameters measured by the one or more sensors includes through valve leakage.

Aspect 37: The valve coupler of any one of aspects 21 to 36, further comprising a wireless communication module configured to communicate via a wireless standard with a module that collects and/or processes the one or more parameters to determine the health and/or remaining service life of the control valve assembly and/or one or more components of the control valve assembly.

Aspect 38: The valve coupler of aspect 37, wherein the module with which the wireless communication module is configured to communicate is part of a digital valve controller.

Aspect 39: The valve coupler of any one of aspects 21 to 38, wherein the one or more sensors implements a piezoelectric device that generates energy from the actuation of the control valve and/or the operating environment of the control valve assembly via the valve coupler.

Aspect 40: A method of measuring the health and/or remaining service life of a control valve assembly and/or one or more components of the valve assembly, the method comprising measuring, via one or more sensors in a valve coupler coupling an actuator to a control valve, one or more parameters, and transmitting the measured one or more parameters to a module configured to collect and process the one or more parameters to determine the health and/or remaining service life of the control valve assembly and/or one or more components of the control valve assembly.

Aspect 41: The method of aspect 40, wherein measuring the one or more parameters comprises measuring the one or more parameters via an accelerometer.

Aspect 42: The method of either aspect 40 or aspect 41, wherein measuring the one or more parameters comprises measuring the one or more parameters via an acoustic emission sensor.

Aspect 43: The method of aspect 42, further comprising implementing the acoustic emission sensor such that the acoustic emission sensor is disposed at a flat end of an input to the control valve, such that the input to the control valve acts as a wave guide for acoustic emissions, transmitting acoustic energy from a cavity within the control valve to the acoustic emission sensor.

Aspect 44: The method of any one of aspects 40 to 43, wherein measuring the one or more parameters comprises measuring the one or more parameters via a stem force sensor.

Aspect 45: The method of any one of aspects 40 to 44, wherein measuring the one or more parameters comprises measuring the one or more parameters via a shaft torque sensor.

Aspect 46: The method of either aspect 44 or aspect 45, wherein measuring the one or more parameters comprises measuring valve seat force or valve seat torque.

Aspect 47: The method of any one of aspects 44 to 46, wherein measuring the one or more parameters comprises measuring friction.

Aspect 48: The method of any one of aspects 44 to 47, wherein measuring the one or more parameters comprises measuring dynamic stem force.

Aspect 49: The method of aspect 48, wherein measuring the one or more parameters further comprises measuring or calculating flow stability within the control valve.

Aspect 50: The method of any one of aspects 40 to 49, wherein measuring the one or more parameters comprises measuring strain.

Aspect 51: The method of any one of aspects 40 to 50, wherein measuring the one or more parameters comprises measuring vibration due to flow and/or trim looseness.

Aspect 52: The method according to any one of aspects 40 to 51, further comprising generating and storing energy using a piezoelectric device disposed in the valve coupler.

What is claimed is:

1. A system for controlling a valve, the system comprising:
    a control valve assembly including a stem slidably attached to a valve body;
    an actuator coupled to the control valve assembly, the actuator including an actuator rod providing linear movement to the stem;
    a coupler configured to receive a first end of the stem and a first end of the actuator rod thereby slidably coupling the stem and the actuator rod, wherein linear movement of the actuator rod provided by the actuator results in linear movement of the stem, and wherein the coupler further configured to wirelessly transmit a mechanical actuator output to an input of the control valve assembly;
    a wireless communication module integral with the coupler and coupled to one or more sensors therein, wherein the one or more sensors measuring one or more parameters indicative of the health and/or remaining service life of the control valve assembly and/or one or more components of the control valve assembly.

2. The system of claim 1, wherein
    the one or more sensors includes a vibration sensor for providing data related to flow induced vibration and/or looseness of internal control valve components.

3. The system of claim 1, wherein the one or more sensors includes an accelerometer and/or an acoustic emission sensor.

4. The system of claim 3, wherein the one or more sensors includes an acoustic emission sensor disposed at a flat end of the input to the control valve, such that the input to the control valve acts as a wave guide for acoustic emissions, transmitting acoustic energy from a cavity within the control valve to the acoustic emission sensor.

5. The system of claim 1, wherein the measured one or more parameters received at the communication module by the one or more sensors are stored, analyzed, and/or wirelessly transmitted to a controller.

6. The system of claim 1, wherein the one or more parameters measured by the one or more sensors includes strain, vibration due to flow and/or trim looseness, and/or through valve leakage.

7. The system of claim 5, wherein the communication module configured to communicate via a wireless standard or any other wireless communications protocol with the controller.

8. A coupler for a control valve assembly for controlling a valve, the coupler comprising:
    a first portion configured to receive an end of an actuator rod of an actuator;
    a second portion configured to receive an end of a stem slidably attached to a valve body of the control valve assembly, wherein the coupler slidably couples the actuator rod and the stem, and wherein linear movement of the actuator rod provided by the actuator results in linear movement of the stem;
    one or more sensors attached to the coupler and measuring one or more parameters indicative of the health and/or remaining service life of the control valve assembly and/or one or more components of the control valve assembly; and
    a wireless communication module integrated with the coupler and communicably coupled to the one or more sensors.

9. The portable stem connector of claim 8, wherein, the measured one or more parameters received at the communication module by the one or more sensors are stored, analyzed, and/or wirelessly transmitted to a controller.

10. The valve coupler of claim 8, wherein the one or more sensors includes an accelerometer and/or an acoustic emission sensor.

11. The valve coupler of claim 10, wherein the acoustic emission sensor is disposed at a flat end of the movable component of the control valve, such that the movable component of the control valve acts as a wave guide for acoustic emissions, transmitting acoustic energy from a cavity within the control valve to the acoustic emission sensor.

12. The portable stem connector of claim 8, wherein the one or more sensors includes a vibration sensor for providing data related to flow induced vibration and/or looseness of internal control valve components.

13. The portable stem connector of claim 8, wherein the communication module configured to communicate via a wireless standard or any other wireless communications protocol with the controller.

14. The valve coupler of claim 8, wherein the one or more parameters measured by the one or more sensors includes strain.

15. The portable stem connector of claim 8, wherein the one or more sensors implements a piezoelectric device that generates energy from the actuation of the control valve assembly and/or one or more components of the control valve assembly and/or the operating environment of the control valve assembly via the valve coupler.

16. A method of measuring the health and/or remaining service life of a control valve assembly and/or one or more components of the control valve assembly, the method comprising:
  affixing a first end of a stem slidably attached to a valve body to a coupler;
  affixing a first end of an actuator rod of an actuator to the coupler thereby slidably coupling the stem and the actuator rod, wherein linear movement of one of the actuator rod provided by the actuator results in linear movement of the stem, and wherein the coupler including a wireless communication module integrated therein and one or more sensors measuring one or more parameters indicative of the health and/or remaining service life of the control valve assembly and/or the one or more components of the control valve assembly;
  measuring, via the one or more sensors, one or more parameters related to flow induced vibration and/or looseness of internal control valve assembly components; and
  wirelessly transmitting the measured one or more parameters to a controller for storing and/or analyzing the measured one or more parameters.

17. The method of claim 16, wherein measuring the one or more parameters comprises measuring the one or more parameters via an accelerometer and/or an acoustic emission sensor.

18. The method of claim 17, further comprising implementing the acoustic emission sensor such that the acoustic emission sensor is disposed at a flat end of an input to the control valve, such that the input to the control valve acts as a wave guide for acoustic emissions, transmitting acoustic energy from a cavity within the control valve to the acoustic emission sensor.

19. The method of claim 16, further comprising wirelessly transmitting the stored and/or analyzed measured one or more parameters to a controller to determine the health and/or remaining service life of the control valve assembly and/or one or more components of the control valve assembly.

20. The method of claim 19, wherein the communication module configured to communicate via a wireless standard or any other wireless communications protocol with the controller.

21. The method of claim 16, wherein measuring the one or more parameters comprises measuring strain and/or measuring vibration due to flow and/or trim looseness.

22. The method of claim 16, further comprising generating and storing energy using a piezoelectric device disposed in the portable stem connector.

* * * * *